United States Patent [19]

Fukumoto

[11] Patent Number: 4,905,401
[45] Date of Patent: Mar. 6, 1990

[54] TROLLING LINE RETAINER AND RELEASE DEVICE

[76] Inventor: Akiharu Fukumoto, 287 Rodrigues Ave., Milpitas, Calif. 95035

[21] Appl. No.: 369,057

[22] Filed: Jun. 19, 1989

[51] Int. Cl.$^4$ ............................................. A01K 91/00
[52] U.S. Cl. ..................................................... 43/43.12
[58] Field of Search ........................... 43/43.12, 27.4; 403/DIG. 1, 32

[56] References Cited

U.S. PATENT DOCUMENTS

| | | | |
|---|---|---|---|
| 2,858,637 | 11/1958 | Stark | 43/43.12 |
| 3,518,784 | 7/1970 | Kling | 43/43.12 |
| 3,659,370 | 5/1972 | Ritter | 43/43.12 |
| 3,874,110 | 4/1975 | Larson | 43/12 |
| 3,925,920 | 12/1975 | Walker | 43/43.12 |
| 3,974,589 | 8/1976 | Henze | 43/43.12 |
| 4,031,652 | 6/1977 | Johnson | 43/12 |
| 4,173,091 | 11/1979 | Emory | 43/43.12 |
| 4,221,068 | 9/1980 | Roemer | 43/43.12 |
| 4,453,336 | 6/1984 | Lowden | 43/43.12 |
| 4,520,589 | 6/1985 | Lummis | 43/43.12 |
| 4,656,776 | 4/1987 | Macachor | 43/12 |
| 4,817,328 | 4/1989 | Hartley | 43/43.12 |

Primary Examiner—Kurt Rowan

[57] ABSTRACT

A trolling line retainer and release device for use with downriggers or outriggers comprising a conical magnet molded into a hinged cap and a mating threaded conical magnetically permeable closure containing components used to attach the invention to a downrigger or outrigger cable. The latching cap securing the line at one end of the cap that is pinned at the diametrically opposite end to provide a moment to delatch the magnet upon a fish striking the lure or bait. The magnetic biased line retainer consist of two elastomer pads shaped to provide a serpentine path to secure the line. The retention force of the line being adjustable by varying the gap between the magnet and the magnetically permeable closure. The cable attachment mechanism is spring biased to provide a shear force between a piston and the cylindrical housing. The position of the piston can be changed by a simple rotation of a lever, located at the rear of the housing, to unlock the cable and permit free sliding movement of the device. Conversely the device can be locked on the cable by returning the lever to its normal position.

6 Claims, 6 Drawing Sheets

TROLLING LINE RETAINER AND RELEASE DEVICE

BACKGROUND

1. Field of Invention

This invention relates to fishing line retainer and release mechanism when trolling with an outrigger or downrigger.

2. Description of Prior Art

When trolling for fish it is desireable to present the lure or bait at the depth where fish is suspected to be holding. Fish at depths are fished with a heavy weight attached to a cable that is payed from a spool attached to a short boom anchored to the boat. Fish near the surface are fished with cables attached to pulleys on outrigger poles. A device is necessary to attach the fishing line to the cable and to release the line upon a fish striking the bait or lure. The hooked fish is then under the control of the rod and reel held by the fisherperson.

It is desireable to have the line unencumbered by any extraneous weight that could cause an unexpected failure of the line or loss of the fish. Especially when one is using light (rated at 6 pounds or less) fishing lines. As fishing with light lines appears to be the trend at the present time an improved device that permits trolling with such lines is desireable.

Typical existing devices use spring biased button clamps to hold the lines and threaded clamps, rings or spring biased clips to attach and position the devices to the cables of downriggers and outriggers. A device described in U.S. Pat. No. 4,453,336 to Lowden (1984) uses a resilient material to attach the device to the downrigger cable but requires clips or other devices to position the unit on the cable. The line holder described in U.S. Pat. No. 4,221,068 to Roemer (1980) employs a cam-like device actuated by a lever to lock the unit to the downrigger cable. These devices rely on spring biased methods to hold the fishing lines as many others do.

Other devices, such as those described in U.S. Pat. Nos. 3,874,110, 4,031,652 and 4,656,776, use magnets in various configurations to retain the lines. The devices described in U.S. Pat. No. 3,874,110 to Larson (1975) and U.S. Pat. No. 4,031,652 to Johnson (1977) rely primarily upon the striking force of the fish overcoming the attractive force between the magnet and the magnetic disc and is directly dependent upon the attractive force between the two bodies. U.S. Pat. No. 4,031,652 provides the capability of adjusting the magnetic latching force and, therefore, is not dependent upon the manufacturing variability of the strength of the magnet. In both devices the magnetic disc remains on the line while the fish is being controlled by the fisherperson. Such weight induces undue strain on the line which may cause premature failure or the unexpected movements of the hooked fish may result in the loss of fish.

In the device described in U.S. Pat. No. 4,656,776 to Macachor (1987) a lever is used to develop a moment to overcome the attractive force between a magnet and magnetic disc. In this device a round post, perpendicular to the magnetic lever, is used to retain a line which is wrapped around the post. Position of the magnet is variable to increase or decrease the moment required to unlatch the magnet. However, the design appear to be difficult to use because the wrapping of the line to the post does not provide a positive means of maintaining the spacing between the device and the lure. This is especially true in cold weather when the fishing line is relatively stiff.

This shortcoming is not restricted to the Macachor design alone as other designs rely on wrapping of the lines in one manner or other to hold the line.

SUMMARY OF THE INVENTION

The invention described herein uses a cone shaped magnet and a mating cone shaped magnetically permeable body to provide more precise adjustment of the magnetic attraction between a pivoting cap and the body. The magnet, with a conical cavity, is molded into a plastic cap. The cap is pinned at the outer periphery to the body at one end of the mating surface. The fishing line, retained at the diametrically opposite side of the device, is clamped between body and cap. Elastomeric pads attached to the clamping surfaces of the body and cap assures retention of the line independent of the magnetic force. An adjustable threaded conical shaped screw provides the mating magnetic portion of the attractive force. In addition, the screw is used as a closure for a spring biased downrigger cable retention mechanism within the cylindrical body. The spring biased piston clamps to the downrigger or outrigger cable, herein after referred to simply as the cable, through a shearing action between the piston and body. The device can also be made to slip on the cable by simply rotating a ball through a small angle to displace the piston. The ball being located at the rear of the piston.

Additional objects, features and advantages of the invention will become apparent from the detailed description of the components shown in the drawings of the preferred embodiment.

OBJECTS AND ADVANTAGES

Accordingly, several objects and advantages of my invention are:

1. to provide unrestricted use of lines of various breaking strength unlike some of the prior art devices;

2. to provide the capability of adjusting the line retention force by varying the gap between the magnet and the mating magnetic screw;

3. to provide unencumbered control of the fish by any extraneous hardware while the fish is under the control of the line and reel held by the fisherperson;

4. to provide the capability of attaching the device to a cable by the simple act of depressing a spring, inserting the cable into a slot with detents and releasing the spring;

5. to provide the capability of being able to freely slide the device on the cable by simply rotating a lever located at the rear of the unit;

5. one object is to provide the ability to use several units on a single cable;

7. another object is to provide the ability to lower another line to the point were a first unit positioned at the depth where fish has been located;

8. a third object is to provide a device attached to the cable as an entity throughout its use without the necessity of any additional components, unlike many existing devices.

Additional objects and advantages will become apparent from a consideration of the drawings and ensuing descriptions.

REFERENCE NUMERALS IN DRAWINGS

| | |
|---|---|
| 10. Downrigger cable | 12. Fishing line |
| 14. Line retainer and release device | 16. Downrigger weight |
| 18. Lure or bait | 20. Lead line |
| 22. Housing | 24. Line retainer cap |
| 26. Magnet | 28. Magnetic closure |
| 30. Elastomeric pad (housing) | 32. Elastomeric pad (cap) |
| 34. Closure adjusting slot | 36. Cap pivot pin |
| 38. Spring guide | 40. Spring |
| 42. Piston | 44. Piston cable slot |
| 46. Piston cable detent | 48. Housing cable slot |
| 50. Housing cable detent | 52. Piston positioning ball |
| 54. Lever | 56. Conical cavity |
| 58. Raised hemispherical button | |

DESCRIPTION OF INVENTION

Figure 1:
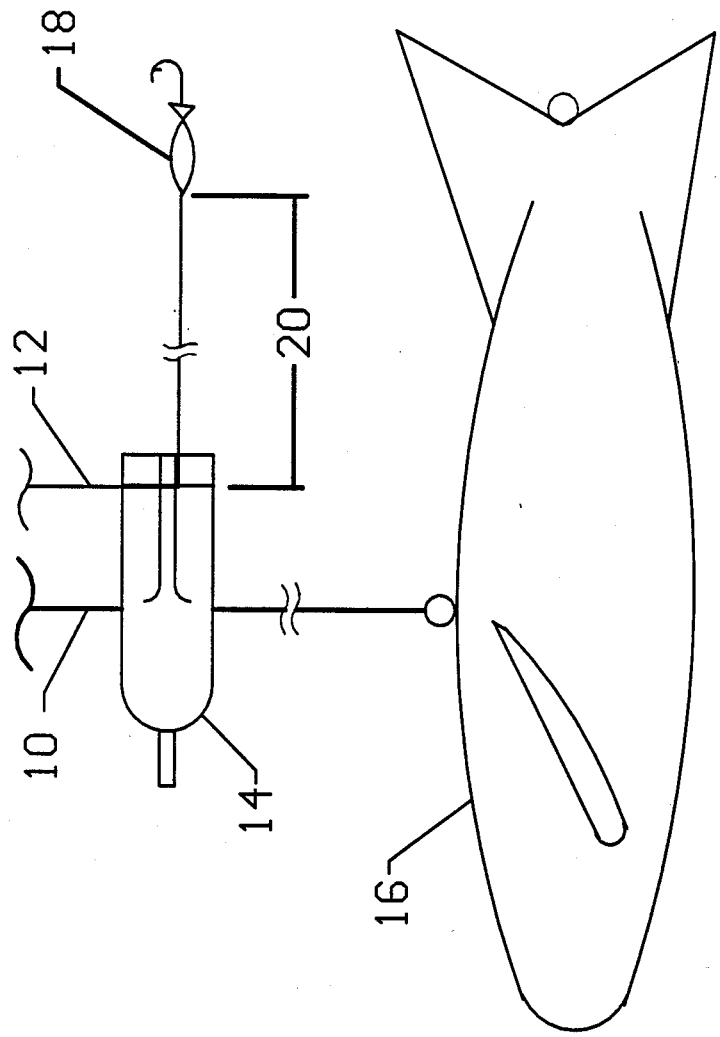
FIG. 1 is a partial schematic view of the the device attached to the cable and retaining the fishing line.

The partial schematic of FIG. 1 illustrates the typical arrangement of trolling with a downrigger. The line retention and release device 14 is shown attached to the downrigger cable 10 above the downrigger weight 16. The fishing line 12 is retained by the elastomeric pad 30 attached to the housing 22 and the elastomeric pad 32 attached to the cap 24, illustrated in FIG. 2. The mating surfaces of the pads 30 and 32 are shaped, as shown in FIG. 3, to increase the clamping surface and provide a serpentine path insuring retention of the fishing line.

Figure 2:
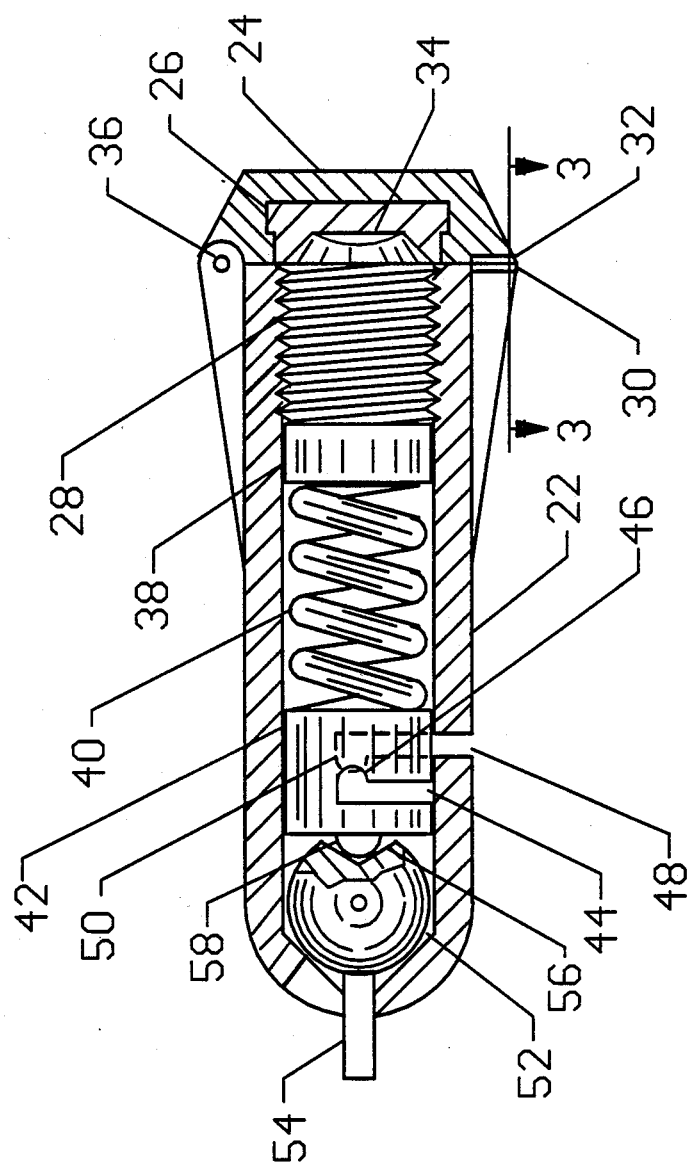
FIG. 2 is a cut-away plan view revealing the components of the preferred embodiment.
Figure 3:
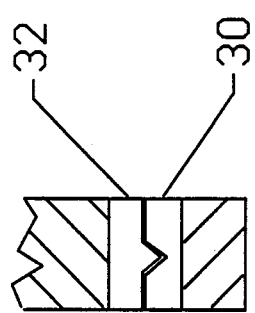
FIG. 3 is the cross sectional view, enlarged, taken approximately on the line 3—3 of FIG. 2.

The invention, FIG. 2, is comprised of a cylindrical housing 22 to which is attached the retainer cap 24 by means of a hinge pin 36. The cap 24 is latched by the conical magnet 26 to the threaded corrosion resistant (CRES) magnetic closure 28 which encloses a plastic spring guide 38, a CRES spring 40, a plastic piston 42 and and a plastic piston positioning ball 52. The magnetic closure 28, hereinafter referred to as closure or magnetic closure, is a threaded screw constructed of a magnetically permeable material. The magnet 26 and closure 28 is cone shaped to provide minute adjustments of the latching force. The force between two magnetically attracted bodies is dictated by the perpendicular distance between them. Hence, the perpendicular distance in a cone shaped configuration represent a fraction of the distance travelled by the threaded closure.

Figure 6:
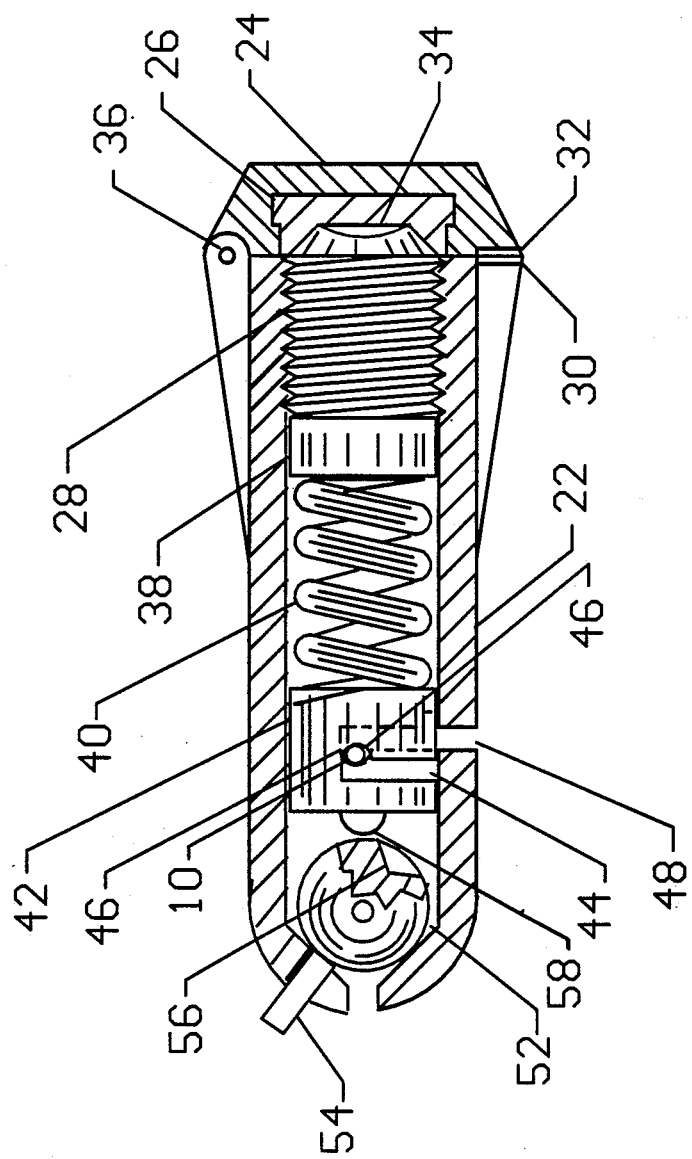
FIG. 6 depicts the cocked ball which results in the device being free to slip on the cable while still being restrained by the cable.

The device is clamped to the downrigger cable 10 by the shear force between the piston 42 and the housing 22. The cable 10 is contained in semi-circular detent 46 at the end of the piston cable slot 44 and the detent 50 at the end of the housing cable slot 48. These detents retains the cable 10 when the ball 52 is rotated, as shown in FIG. 6, to freely move the line retainer and release device 14 on the cable 10.

A conical cavity 56 in the ball 52 fits over a raised hemispherical button 58 on the piston 42 to keep the lever 54 from rotating when it is depressed. The button 58 also displaces the piston 42 sufficiently to free the cable 10, but is retained by the detents 46 and 50, when the ball 52 is rotated with the lever 54, as shown in FIG. 6.

OPERATION OF INVENTION

Figure 4:
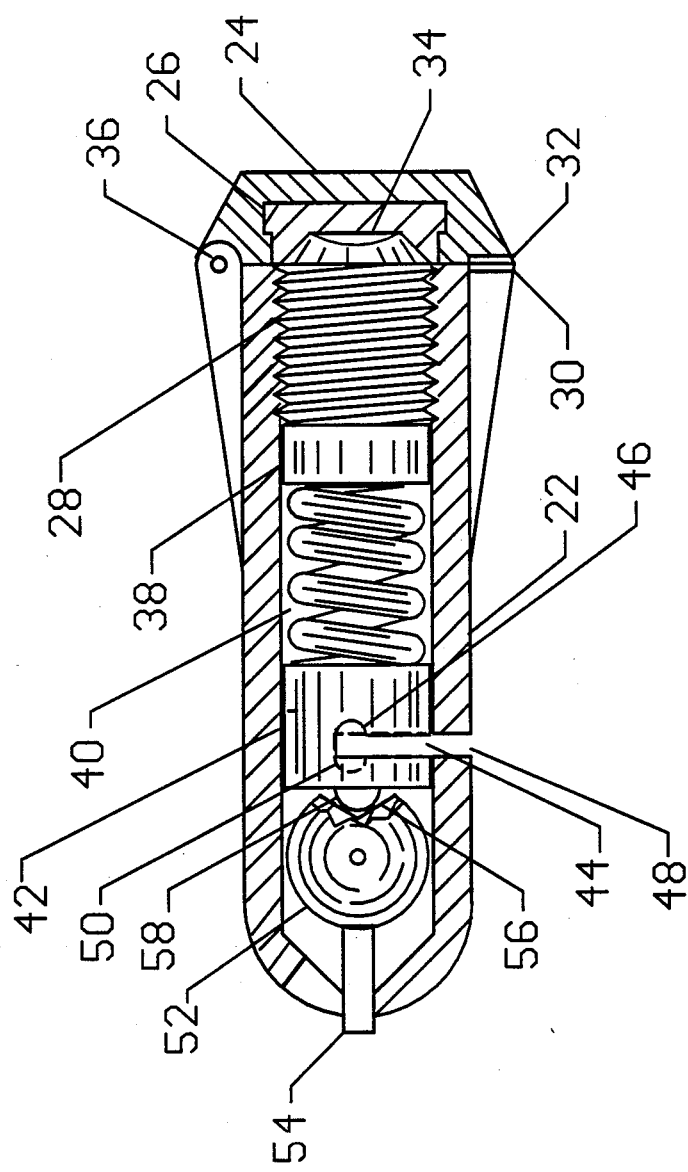
FIG. 4 illustrates the depression of the ball to permit the insertion of the cable into the slot for retention.

The basic technique used to troll with downriggers is to attach the line retaining and release device 14 to the downrigger cable 10 and retain the fishing line 12 until a fish strikes. The invention 14 is attached to the cable by depressing the lever 54 to compress the spring 40 until the slot in the piston 44 and the slot in the housing 48 are aligned, as shown in FIG. 4. The cable 10 is then inserted into the slot until it fits into the detents of the piston 46 and housing 50. Releasing the compressed spring 40 locks the cable 10 in place by the shearing action between the piston 42 and the housing 22 produced by the force of the expanding spring 40.

The fishing line 12 is retaind between the elastomeric pad 30 on the housing and the pad 32 on the cap after an appropriate length of lead line 20 (length of line between the bait or lure 18 and the retainer 14) is selected, FIG. 1. This is accomplished by unlatching the magnet 26 and placing the line 12 on the pad 30 of the housing and positioning the cap 24 to latch the magnet 26 in the closed position. The force required to delatch the magnet 26 without breaking the line 12 is determined by pulling the lead line 20 in the direction to delatch the magnet 26. Ideally the force should be sufficient to hold the line against the drag on the line produced by the moving boat plus 1-2 pounds, sufficient to drive the hook into the fish. The magnetic closure screw 28 is adjusted using a coin in the adjusting slot 34 until the desired release force is obtained. When bait is used it is desireable for the line to be released as soon as a force exceeding the line drags occurs to enable the fish to attack the bait again. This can be accomplished by increasing the distance between the magnet 26 and the magnetic closure 28 to reduce the latching force.

Figure 5:
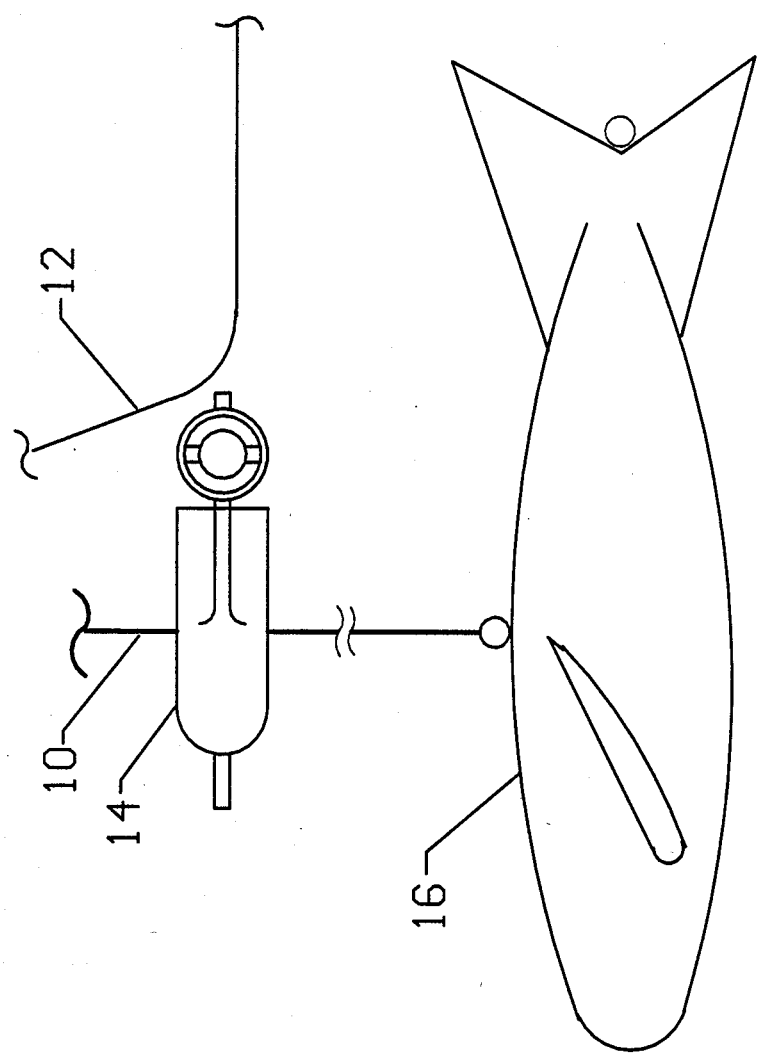
FIG. 5 is a partial schematic view of a downrigger arrangement illustrating the the release of the line immediately following a strike.

With the line 12 positioned in place on the retainer 14, the lever 54 is cocked, as shown in FIG. 6, to permit free movement of the retainer 14 until the desired position above the downrigger weight 16 is selected. The lever 54 is then returned to the normal postion and the entire assembly is lowered to the desired depth as the boat is slowly brought up to the trolling speed. When the fish strikes the lure 18 the latching force of the magnet 26 is sufficient to drive the hook into the fish and the excess force produced by the struggling fish will delatch the magnet, as depicted in FIG. 5. Whereupon the struggling fish will be under the control of the line 12 and fishing pole manned by the fisherperson.

SUMMARY, RAMIFICATION AND SCOPE

The invention can be used for trolling with light to heavy fishing line as the magnetically latched clamp can easily be adjusted to provide the proper retaining force on the line and the line is unemcumbered with any extraneous weight while controlling the struggling fish. In addition, the retainer can easily be attached to the cable and provides the capability to be used without any additional devices.

Although the description provided contain many specific details, these should not be construed as limiting the scope of the invention but as merely providing illustrations of the presently preferred embodiments of this invention. For example, the magnet can be flat to minimize the cost of manufacture of not only the magnet but also the magnetic closure screw. In addition, the spring guide can be an integral part of the magnetic closure to reduce the number of components. However, it should be pointed out that without a separate spring guide, whenever the closure is rotated it tends to rotate the spring which in turn rotates the piston causing the slots to be misaligned. This can be avoided with the use of guides on the housing wall and piston but with a concomitant increase in cost. The ball can also be replaced with a flat disc with a "V" notch to fit over the raised button.

Thus the scope of the invention should be determined by the appended claims and their legal equivalents, rather than by the examples given.

I claim:

1. A downrigger or outrigger fish trolling line retainer and release mechanism comprised of: a round slotted permanent magnet with a conical cavity, embedded in a round plastic cap hinged on one extended edge to a tubular housing; said cap having a second extended edge located diametrically opposite the hinge point, attached to said edge is a shaped elastomeric pad that mates with a similar pad attached to an extended edge on the tubular housing; the tubular housing containing a ball with a lever, a piston, a spring and a spring guide to provide the means to secure the assembly to a downrigger or outrigger cable; and a threaded magnetically permeable closure which provide the means to contain the components in the tubular housing.

2. A fishing line retainer and release mechanism as claimed in claim 1 wherein the mating elastomeric pads have a mating configuration to provide an elongated serpentine path for the line to provide the means to secure the line by the friction between the line and the said pads thereby being independent of the attractive force of the magnet.

3. A fishing line retainer and release mechanism as claimed in claim 1 wherein the mating surfaces of the magnet and the magnetically permeable closure are cone shaped to provide the means to more precisely adjust the attractive force between the two bodies.

4. A fishing line retainer and release mechanism of claim 1 wherein the piston and the housing have equally wide slots with opposite facing detents to provide the means to retain the cable in the detents and secure the assembly of claim 1 to the cable by the shear force developed between the housing and piston by the expanding spring.

5. A fishing line retainer and release mechanism as claimed in claim 1 wherein the ball has a conical cavity and the piston has a raised hemispherical button at the interfacing surfaces to provide the means to lockably compress the spring to permit the insertion of the cable into the detents.

6. A fishing line retainer and release mechanism as claimed in claim 1 wherein the lever attached to the ball provide the means to rotate the ball within limits restricted by a slot in the housing to place the outer periphery of the ball on the hemispherical button of claim 5 to displace the piston sufficiently to permit the free movement of the assembly of claim 1 on the cable.

* * * * *